(12) United States Patent
Parhar

(10) Patent No.: US 11,951,689 B2
(45) Date of Patent: *Apr. 9, 2024

(54) PRIMERS FOR USE WITH SOLVENT CEMENTS

(71) Applicant: OATEY CO., Cleveland, OH (US)

(72) Inventor: Amrit Parhar, Westlake, OH (US)

(73) Assignee: OATEY CO., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,069

(22) Filed: Jun. 2, 2022

(65) Prior Publication Data

US 2022/0288868 A1     Sep. 15, 2022

Related U.S. Application Data

(63) Continuation of application No. 17/101,373, filed on Nov. 23, 2020, now Pat. No. 11,351,741.

(51) Int. Cl.
*B29C 65/00* (2006.01)
*B29C 65/48* (2006.01)

(52) U.S. Cl.
CPC ........ *B29C 66/026* (2013.01); *B29C 65/4895* (2013.01); *B29C 66/71* (2013.01)

(58) Field of Classification Search
CPC ... B29C 66/026; B29C 65/4895; B29C 66/71; B29C 66/522; C08J 2327/06; C08J 7/065; C08J 5/122; C09J 5/02
See application file for complete search history.

(56) References Cited

U.S. PATENT DOCUMENTS

| | | | |
|---|---|---|---|
| 3,765,983 | A | 10/1973 | Putzier |
| 2008/0029213 | A1 | 2/2008 | Scholer et al. |
| 2010/0006220 | A1 | 1/2010 | Parhar et al. |
| 2018/0142131 | A1 | 5/2018 | Parhar et al. |
| 2022/0089493 | A1 | 3/2022 | Parhar et al. |

OTHER PUBLICATIONS

Sharma, "Thermodynamic properties of mixtures containing linear and cyclic ketones", Journal of Molecular Liquids, vol. 195, Jul. 2014, pp. 132-138. (Year: 2014).*
ISA/220—Notification of Transmittal or Search Report and Written Opinion of the ISA, or the Declaration dated Jan. 5, 2022 for WO Application No. PCT/US21/060275.
Outgoing—ISA/210—International Search Report dated Jan. 5, 2022 for WO Application No. PCT/US21/060275.
Outgoing Written Opinion of the ISA dated Jan. 5, 2022 for WO Application No. PCT/US21/060275.
Sharma et al., "Thermodynamic properties of mixtures containing linear and cyclic ketones", J. Mol. Liquids, vol. 195, Jul. 2014, pp. 132-138. (Year: 2014).
Sigma-Aldrich, Product Catalog, Cyclopentanone reagent, 2007. (Year: 2007).
U.S. Appl. No. 17/029,614.

* cited by examiner

*Primary Examiner* — Christopher W Raimund
(74) *Attorney, Agent, or Firm* — Thompson Hine LLP

(57) ABSTRACT

Provided are primer formulations for solvent cement bonding comprising cyclopentanone and, optionally, at least one additional organic solvent. The primer formulations are effective for solvent cement bonding plastic components together, wherein the plastic components may include ABS, PVC, or CPVC pipes and/or fittings.

3 Claims, No Drawings

PRIMERS FOR USE WITH SOLVENT CEMENTS

CROSS-REFERENCE TO RELATED APPLICATIONS

This application is a continuation of U.S. Ser. No. 17/101,373, filed Nov. 23, 2020 (now U.S. Pat. No. 11,351,741), the entirety of which is incorporated by reference herein.

TECHNICAL FIELD

The present disclosure relates to a primer for use with solvent cement in bonding plastic components together, and more particularly, for use in bonding plastic pipes, fittings, or other components.

BACKGROUND

Primers are used in the solvent cement process to help prepare plastic pipes, fittings, surfaces, and other articles or objects for joining components or adhesion by cleaning and softening the object to maximize adhesion once a solvent based adhesive is subsequently applied. The pipes, fittings, or other objects being adhered are typically made from PVC (polyvinyl chloride), CPVC (chlorinated polyvinyl chloride), ABS (acrylonitrile-butadiene-styrene), and other thermoplastics or polymers. Before applying a solvent cement, the surfaces to be joined are normally covered with a primer containing a solvent capable of at least partially dissolving or "softening" the surface to be bonded.

SUMMARY

Provided herein are primer formulations for solvent cement bonding comprising cyclopentanone and, optionally, at least one additional organic solvent.

DETAILED DESCRIPTION OF ILLUSTRATIVE EMBODIMENTS

The present inventions may be understood more readily by reference to the following detailed description taken in connection with the accompanying examples, which form a part of this disclosure. It is to be understood that these inventions are not limited to the specific formulations, methods, articles, or parameters described and/or shown herein, and that the terminology used herein is for the purpose of describing particular embodiments by way of example only and is not intended to be limiting of the claimed inventions.

As employed above and throughout the disclosure, the following terms and abbreviations, unless otherwise indicated, shall be understood to have the following meanings.

In the present disclosure the singular forms "a," "an," and "the" include the plural reference, and reference to a particular numerical value includes at least that particular value, unless the context clearly indicates otherwise. Thus, for example, a reference to "a solvent" is a reference to one or more of such reagents and equivalents thereof known to those skilled in the art, and so forth. Furthermore, when indicating that a certain element "may be" X, Y, or Z, it is not intended by such usage to exclude in all instances other choices for the element.

Although certain existing primers are suitable for preparing a plastic surface for bonding to another plastic surface using a solvent cement, modern safety and environmental guidelines have provided an opportunity for improved primer formulations that, for example, feature a reduced concentration of volatile organic compounds (VOCs). The present inventors have discovered that primer formulations that contain the organic solvent cyclopentanone, optionally in combination with at least one additional organic solvent, function effectively to dissolve plastic surfaces to the degree required to prepare the surface for solvent cementing, as confirmed by testing in accordance with industry standards. These formulations provide such reduced concentrations of VOCs, among other additional benefits.

Accordingly, provided herein are primer formulations for solvent cement bonding comprising cyclopentanone and, optionally, at least one additional organic solvent. Preferably, the primer formulations comprise at least about 30, 31, 32, 33, 34, 35, 36, 37, 38, 39, 40, 41, 42, 43, 44, 45, 46, 47, 48, 49, or 50 wt % cyclopentanone. Throughout the present disclosure, when an amount of a particular component of the inventive primer formulations are expressed in terms of a weight percentage, the recited amount is based on the total weight of the formulation. In certain embodiments, the cyclopentanone is present in the formulations in an amount of between about 40-100 wt %, inclusive. For example, the present formulations can contain at least about 40 wt % cyclopentanone, wherein such an amount is able to dissolve at least 10% resin to satisfy ASTM standards for primer formulations.

The inventive primer formulations optionally include, in addition to the cyclopentanone, at least one additional organic solvent. The one or more additional solvents may be, for example, a lower alcohol, a ketone, an aldehyde, an ester, an ether, a halogenated solvent, N-methyl pyrrolidone, dimethyl-formamide, or any combination thereof. For example, the solvent may be selected from lower (e.g., $C_{1-8}$) alcohols such as methanol, ethanol and isopropanol; ketones such as acetone, methyl ethyl ketone (MEK), methyl isobutyl ketone, isophorone, or cyclohexanone (CYH); esters such as methyl acetate, ethyl acetate, ethyl formate, ethyl propionate, and butyl acetate; ethers such as methyl cellosolve (2-methoxyethanol), and dioxane; and other liquids, such as tetrahydrofuran (THF), N-methyl pyrollidone, and dimethylformamide (DMF). In some embodiments, the one or more additional solvents include methyl ethyl ketone, acetone, cyclohexanone, methylene chloride, dimethylformamide (DMF), methyl isobutyl ketone (MIBK), 1,3 dioxane, methyl acetate, propyl acetate, N-methyl-2-pyrrolidone (NMP), propylene carbonate, or any combination thereof. In other embodiments, the additional organic solvent includes MEK, acetone, cyclopentanone, THF, or any combination thereof. In some embodiments, the additional organic solvent includes cyclohexanone, and optionally THF. In certain embodiments, the primer formulation does not include THF. The primer formulation may be THF-free, by which it is meant that no THF is intentionally included in the formulation, but that there may be up to about 5 wt % of THF due to contamination during manufacture of the primer or its constituent ingredients.

The additional or second solvent or combination of solvents added to cyclopentanone in the primer formulations may be selected based upon the type of plastic surface (e.g., thermoplastic polymer) to which the primer will be applied. For example, a primer formulation intended to be used for solvent cementing PVC components can include cyclopentanone in combination with THF, cyclohexanone, or a combination of THF and cyclohexanone. It should be understood by one having ordinary skill in the art that other solvents can also be used in addition to cyclopentanone for use in solvent cementing PVC components. The solvent or combination of solvents should be capable of dissolving or softening a surface of a thermoplastic polymer or combination of polymers that is preferably the same as the thermoplastic polymer or polymers that are included in the solvent cement formulation for which the primer prepares the plastic surface.

In certain embodiments, the one or more additional organic solvents include acetone, methyl ethyl ketone, cyclohexanone, THF, or any combination thereof. For example, the primer formulations may include, in addition to cyclopentanone, zero to about 55% by weight of methyl ethyl ketone, zero to about 55% by weight cyclohexanone, zero to about 55% by weight of acetone, zero to about 55% by weight THF, or any combination thereof. The primer formulations may include, for example, about 30-50% by weight cyclopentanone, and up to about 55% by weight of methyl ethyl ketone, up to about 55% by weight cyclohexanone, up to about 55% by weight of acetone, up to about 55% by weight THF, or any combination thereof.

In exemplary embodiments, the primer formulations are capable of dissolving at least 10% by weight of polyvinyl chloride (PVC) resin within 60 minutes, in accordance with the requirements of ASTM F656.

In an exemplary embodiment, the present primers further include a colorant, which can include, without limitation, any colorant known to be used or typically found in tinted primers.

In certain embodiments, the primer is housed within a package. Such a package includes, for example, a tube, a canister, or a brush bottle.

The primer formulation in the primer/solvent cement systems may be in accordance with any of the embodiments described in the present disclosure.

Conventional solvent cements, and indeed a solvent cement of the present systems, contains a thermoplastic resin dissolved in an organic solvent. In the primer/solvent cement system, the solvent cement may comprise, for example, dissolved PVC, CPVC, ABS, or any combination thereof. The organic solvent or combination of organic solvents may be selected from any of the organic solvents described elsewhere in the present disclosure for use in the inventive primer formulations. In some embodiments, all or some of the solvents in the solvent cement may be the same as the solvent or solvents in the primer system.

In some embodiments, the solvent cement may be any of the embodiments described in U.S. Ser. No. 17/029,614, filed on Sep. 23, 2020.

The following examples illustrate an exemplary embodiment and features encompassed by the general inventive concepts. The examples are given solely for the purpose of illustration and are not to be construed as limiting the present disclosure, as many variations thereof are possible and also encompassed by the general inventive concepts.

EXAMPLE 1

An exemplary primer formulation contains 45 wt % cyclopentanone and 55 wt % acetone A trace amount of a purple colorant is added.

EXAMPLE 2

Another exemplary primer formulation contains 40 wt % cyclopentanone, 40 wt % acetone, and 20 wt % MEK.

What is claimed:

1. A THF-free primer formulation for use with solvent cements, wherein the primer formulation consists of:
   cyclopentanone in an amount of 30 wt % to 50 wt % based on the total weight of the formulation;
   40% to 55% acetone based on the total weight of the formulation,
   at least one additional organic solvent selected from the group consisting of methyl ethyl ketone, cyclohexanone, N-methyl-2-pyrrolidone, and mixtures thereof;
   optionally, one or more fillers or additives; and
   optionally, a colorant composition;
   wherein the primer formulation is configured to bond components having resin-based surfaces and is capable of dissolving at least 10% of the resin-based surfaces.

2. A THF-free primer formulation for use with solvent cements to bond components having a resin-based surface, wherein the primer formulation consists of:
   cyclopentanone in an amount of 45 wt % based on the total weight of the formulation;
   up to 55% acetone based on the total weight of the formulation; and
   a colorant composition;
   wherein the primer formulation is configured to dissolve at least 10% of the resin-based surface.

3. A THF-free primer formulation for use with solvent cements to bond components having a resin-based surface, wherein the primer formulation consists of:
   cyclopentanone in an amount of 40 wt % based on the total weight of the formulation;
   up to 40% acetone based on the total weight of the formulation;
   up to 20% methyl ethyl ketone, and
   a colorant composition;
   wherein the primer formulation is configured to dissolve at least 10% of the resin-based surface.

* * * * *